June 8, 1926.

F. S. GALLAGHER

BRAKE HANGER SUPPORT

Filed Feb. 19, 1925

1,588,181

WITNESSES
A B Wallace.

INVENTOR
Frederick S. Gallagher
Deceased
By Sadie F. Gallagher
Executrix.
by Winter Brown + Critchlow
her attorneys.

Patented June 8, 1926.

1,588,181

UNITED STATES PATENT OFFICE.

FREDERICK S. GALLAGHER, DECEASED, LATE OF YONKERS, NEW YORK; BY SADIE E. GALLAGHER, EXECUTRIX, OF YONKERS, NEW YORK.

BRAKE-HANGER SUPPORT.

Application filed February 19, 1925. Serial No. 10,348.

The invention relates to trucks for railway cars, and has particularly to do with the manner of pivotally attaching the upper ends of brake hangers to truck frames.

As is well known, brake hangers are used to suspend brake beams from truck frames, the beams being attached to the lower ends of the hangers, and the upper ends of the hangers being pivotally attached in fixed positions to truck frames. Through a suitable system of levers connecting the beams with piston rods of brake cylinders the beams are swung to apply their attached brake shoes to the truck wheels.

It is also well known that in service railway car wheels decrease in radius from one and a half to one and three-quarter inches from the time they first go into service until they are condemned for replacement or retiring. This diminution in radius is all incidental to wear, although part may be direct wear and part be turning down because of uneven wear. Because the upper ends of the brake hangers are supported in fixed positions, that is to say on fixed pivot axes, this variation in the radii of wheels makes corresponding variations in the required movements of brake beams for applying the brakes. Hence, when a pair of wheels are worn down to a considerable extent, there is a delay in the application of the brakes, and, if the stroke of the brake-applying piston rod is sufficient to take care of the required increase in the throw of the brake beam, the full movement of the beam will not apply to the brakes.

The object of this invention is to provide railway trucks in which the position of the pivotal attachment of the upper ends of brake hangers may be varied to compensate for the wear on truck wheels so that adequate braking pressure may be promptly applied to the wheels after they have become worn, as well as when they are new.

Figure 1:
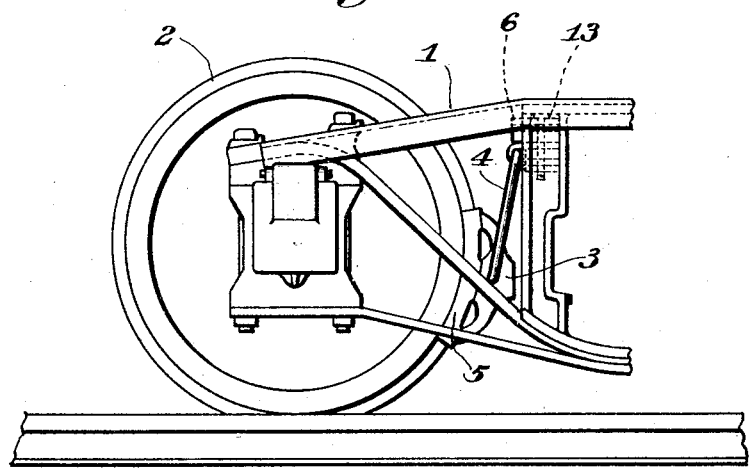
Figure 3:
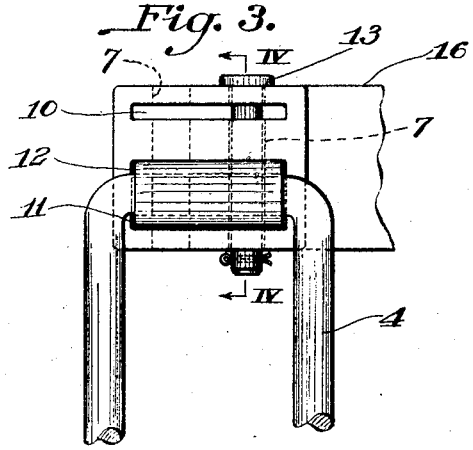
Figure 2:
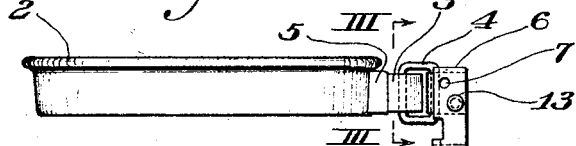

The invention is illustrated in the accompanying drawings of which Fig. 1 is an elevation of a portion of a railway car truck; Fig. 2 a plan view of a portion of the truck shown in Fig. 1; Fig. 3 a vertical sectional view to enlarged scale taken on the line III—III, Fig. 2, showing the attachment of a brake hanger to the frame; and Fig. 4 a vertical sectional view taken on the line IV—IV, Fig. 3.

In the practice of the invention provision is made for attaching the upper end of a brake hanger to a truck frame in various adjustable positions so that when the rim or tire of the wheel becomes smaller the pivotal axis of the brake hanger may be moved to compensate for such wear.

Having reference to the illustrative embodiment of the invention, a truck frame 1 is shown as being provided with a wheel 2, and as having a brake beam 3 pivotally attached to it by a closed link brake hanger 4, the brake beam being provided with a shoe 5. The brake hanger may be of any desired form of construction, and is not necessarily of the closed link type. For pivotally attaching the upper end of the brake hanger to the truck frame in such a manner that the pivotal axis may be adjusted in the manner stated, the frame is preferably provided with a bracket 6 having a plurality of horizontally disposed openings adapted to receive the legs 8 and 9 of a stirrup, the closed end of which forms a bearing for the upper end of the brake hanger. Preferably bracket 6 is off-set in the manner illustrated particularly in Fig. 4, the upper portion of the bracket projecting beyond its lower portion, a horizontally disposed opening 10 being provided in the upper portion of the bracket, a similar opening 11 in the lower portion, and a similar opening 12 at the juncture of these portions. These openings may conveniently be spaced at uniform vertical intervals so that the legs 8 and 9 of the brake hanger stirrup may be arranged in any two adjacent openings. Manifestly the bracket may have an increased number of off-sets to provide for a wider range of horizontal and vertical adjustment of the pivot axis of the brake hanger. For attaching the stirrup to bracket 6 the legs of the stirrup and the walls of the bracket which form its horizontally disposed stirrup-receiving openings may be provided with a plurality of registering vertically-disposed holes 7 adapted to receive a cotter pin 13 or other suitable connecting member.

Figure 4:
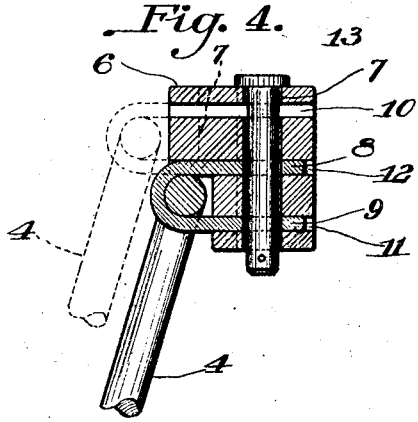

When the truck wheels are new and unworn the hanger-attaching stirrup is arranged in openings 11 and 12 of bracket 6, as shown in full lines in Fig. 4, so that the pivot point of the hanger is in a proper position to so suspend the brake beam that it may be promptly and sufficiently moved to apply the brakes. In this position of the stirrup, pin 13 is arranged in the pin-receiving holes 7 nearer to the inner end of the bracket. After the truck wheels have become considerably worn, the stirrup may be placed in the upper two horizontal openings 10 and 12 of the bracket, as shown in dotted lines in Fig. 4, and the cotter pin inserted in the holes 7 which are more remote from the inner end of the bracket and nearer to wheel 2. By so changing the position of the stirrup the pivot axis of the brake hanger is adjusted vertically upwardly and horizontally outwardly to suspend the brake beam closer to the wheels and nearer to the proper angular position of the truck wheels for the most effective application of the brakes.

According to the provisions of the patent statutes, I have explained the principle and operation of my invention, and have illustrated and described what I now consider to be its best embodiment. However, I desire to have it understood that, within the scope of the appended claims, the invention may be practiced by other forms of construction than those particularly illustrated and described.

I claim as my invention:

1. In a railway truck, the combination of a truck frame provided with wheels, a hanger supporting a brake at its lower end, and means for attaching the upper end of the hanger to said frame in a plurality of fixed positions varying both vertically and horizontally with relation to the truck, whereby the position of said brake may be varied to compensate for wear on the truck wheels.

2. In a railway truck, the combination of a truck frame provided with wheels, a hanger supporting a brake at its lower end, a bracket attached to said frame and provided with a plurality of spaced openings for attaching the upper end of said hanger in various positions whereby the position of said brake may be varied with relation to the frame to compensate for wear on the truck wheels.

3. In a railway truck, the combination of a truck frame provided with wheels, a hanger supporting a brake at its lower end, a bracket attached to said frame and provided with a plurality of horizontally disposed openings spaced vertically at uniform intervals with relation to each other, a stirrup engaging the upper end of said hanger, and means for attaching said stirrup to said bracket with the ends of the stirrup arranged in any two adjacent openings of the bracket.

In testimony whereof, I sign my name.

SADIE E. GALLAGHER,
*Executrix of the Last Will and Testament of Frederick S. Gallagher, Deceased.*